(12) United States Patent
Susanto et al.

(10) Patent No.: US 9,748,878 B1
(45) Date of Patent: Aug. 29, 2017

(54) ADAPTIVE BRAKE TIMING FOR A BRUSHLESS MOTOR

(71) Applicant: Marvell International Ltd., Hamilton (BM)

(72) Inventors: Edy Susanto, Singapore (SG); Ravishanker Krishnamoorthy, Singapore (SG); Sundaraiah Gurindagunta, Andhra (IN)

(73) Assignee: MARVELL INTERNATIONAL, LTD., Hamilton (BM)

( * ) Notice: Subject to any disclaimer, the term of this patent is extended or adjusted under 35 U.S.C. 154(b) by 0 days.

(21) Appl. No.: 15/233,335

(22) Filed: Aug. 10, 2016

Related U.S. Application Data

(60) Provisional application No. 62/206,615, filed on Aug. 18, 2015.

(51) Int. Cl.
| | |
|---|---|
| *H02P 6/04* | (2016.01) |
| *H02P 3/00* | (2006.01) |
| *H02P 3/14* | (2006.01) |
| *H02P 6/24* | (2006.01) |
| *H02P 6/182* | (2016.01) |
| *H02P 6/22* | (2006.01) |
| *H02K 11/215* | (2016.01) |

(52) U.S. Cl.
CPC .............. *H02P 6/24* (2013.01); *H02K 11/215* (2016.01); *H02P 6/182* (2013.01); *H02P 6/22* (2013.01)

(58) Field of Classification Search
CPC .... H02P 6/22; H02P 6/185; H02P 6/30; H02P 1/029; H02P 21/16; H02P 21/34; H02P 3/22; H02P 6/06; H02P 6/187; H02P 6/24; H02P 1/26; H02P 21/0053; H02P 21/0085; H02P 21/146; H02P 21/18
USPC ........................ 318/281, 286, 432, 376, 400.1
See application file for complete search history.

(56) References Cited

U.S. PATENT DOCUMENTS

| | | | | |
|---|---|---|---|---|
| 4,406,981 A | * | 9/1983 | Watanabe | ................. H02P 3/10 318/258 |
| 4,418,303 A | * | 11/1983 | Abe | ......................... H02P 6/30 318/400.26 |
| 4,678,973 A | * | 7/1987 | Elliott | ....................... H02P 6/22 318/272 |
| 4,862,051 A | * | 8/1989 | Moteki | ..................... H02P 8/26 318/685 |
| 5,089,759 A | * | 2/1992 | Miotke | ................ G05B 19/232 318/568.11 |
| 5,097,190 A | * | 3/1992 | Lyons | ................... H02P 25/089 318/400.01 |
| 5,198,734 A | * | 3/1993 | Johnson | .................... H02P 1/26 318/275 |

(Continued)

*Primary Examiner* — Paul Ip

(57) ABSTRACT

A method is performed by a drive circuit that controls a brushless motor. The brushless motor includes a rotor and a coil structure. The coil structure includes at least one coil. The circuit receives an instruction to drive the rotor in a forward direction. The circuit senses a residual direction of the rotor and a residual speed of the rotor. At least partially in response to the sensed residual direction being reverse direction which is opposite the forward direction, the circuit determines a time period as a function of the sensed residual speed, for applying a brake to the motor to slow the rotor. The brake is applied for the determined time period. After lapse of the determined time period, the circuit initiates driving the rotor to rotate in the forward direction.

20 Claims, 4 Drawing Sheets

(56) References Cited

U.S. PATENT DOCUMENTS

| | | | | |
|---|---|---|---|---|
| 5,220,259 A * | 6/1993 | Werner | F04B 49/065 | |
| | | | 318/432 | |
| 5,235,264 A * | 8/1993 | Kaneda | H02P 6/185 | |
| | | | 318/400.38 | |
| 5,293,760 A * | 3/1994 | Tani | D06F 39/003 | |
| | | | 68/12.02 | |
| 5,320,421 A * | 6/1994 | Kade | B60T 8/4266 | |
| | | | 303/115.2 | |
| 5,341,452 A * | 8/1994 | Ensor | D06F 35/006 | |
| | | | 318/281 | |
| 5,355,061 A * | 10/1994 | Forhan | B60S 1/08 | |
| | | | 318/259 | |
| 5,361,022 A * | 11/1994 | Brown | H02P 3/12 | |
| | | | 318/375 | |
| 5,428,284 A * | 6/1995 | Kaneda | H02P 6/185 | |
| | | | 318/400.13 | |
| 5,670,852 A * | 9/1997 | Chipperfield | F04B 49/06 | |
| | | | 318/250 | |
| 5,894,204 A * | 4/1999 | Kumita | G11B 19/20 | |
| | | | 318/362 | |
| 5,982,119 A * | 11/1999 | Okada | G11B 19/22 | |
| | | | 318/286 | |
| 6,025,683 A * | 2/2000 | Philipp | H02P 7/2913 | |
| | | | 318/139 | |
| 6,046,559 A * | 4/2000 | Iwasaki | H02P 3/18 | |
| | | | 318/364 | |
| 6,078,152 A * | 6/2000 | Dieterle | H02P 6/22 | |
| | | | 318/246 | |
| RE37,360 E * | 9/2001 | Duncan | D06F 37/306 | |
| | | | 318/281 | |
| 6,459,230 B1 * | 10/2002 | Tao | H02P 6/182 | |
| | | | 318/798 | |
| 7,652,441 B2 * | 1/2010 | Ying Yin Ho | H02P 1/029 | |
| | | | 318/101 | |
| 2007/0001635 A1 * | 1/2007 | Ho | H02P 1/029 | |
| | | | 318/400.11 | |
| 2014/0232311 A1 * | 8/2014 | Hill | H02P 6/186 | |
| | | | 318/400.33 | |
| 2014/0246995 A1 * | 9/2014 | Yoshitomi | H02P 6/30 | |
| | | | 318/282 | |

* cited by examiner

ADAPTIVE BRAKE TIMING FOR A BRUSHLESS MOTOR

CROSS-REFERENCE TO RELATED APPLICATION

This application claims priority from U.S. Provisional Application No. 62/206,615, filed Aug. 18, 2015, hereby incorporated herein by reference.

TECHNICAL FIELD

The technology discussed herein relates to motor controllers for controlling a brushless motor and, more particularly, to controlling the application of a brake to the brushless motor.

BACKGROUND

A brushless motor includes a rotor and coils. A drive circuit includes transistors that activate the coils with a sequence of electrical pulses that are properly timed to drive the rotor in a forward direction. Before being driven to rotate in the forward direction by the drive circuit, the rotor might have a residual spin in a reverse direction. Initiating the sequence of pulses to drive rotation in the forward direction, when the rotor has a reverse residual spin, might cause the coils and transistors to conduct an excessive amount of current and overheat The description above is presented as a general overview of related art in this field and should not be construed as an admission that any of the information it contains constitutes prior art against the present patent application.

SUMMARY

Examples of a system and method for determining the spin direction for a brushless motor are provided.

In an example method, a drive circuit controls a brushless motor. The brushless motor includes a rotor and a coil structure. The coil structure includes at least one coil. The circuit receives an instruction to drive the rotor in a forward direction. The circuit senses a residual direction of the rotor and a residual speed of the rotor. At least partially in response to the sensed residual direction being a reverse direction which is opposite the forward direction, the circuit determines a time period as a function of the sensed residual speed, for applying a brake to the motor to slow the rotor. The brake is applied for the determined time period. After lapse of the determined time period, the circuit initiates driving the rotor to rotate in the forward direction.

In an example system, a drive circuit controls a brushless motor. The brushless motor includes a rotor and a coil structure including at least one coil. An input of the circuit is configured to receive a request to drive the rotor in a forward direction. A direction sense module of the circuit senses a residual direction of the rotor. A speed sense module of the circuit senses a residual speed of the rotor. A processor of the circuit is configured to, at least partially in response to the residual direction being a reverse direction opposite the forward direction, determine a time period, as a function of the speed, for applying a brake to the motor to slow the rotor. The processor applies the brake for the calculated time period, and initiates driving the rotor in the forward direction after lapse of the calculated time period.

DETAILED DESCRIPTION

Figure 1:
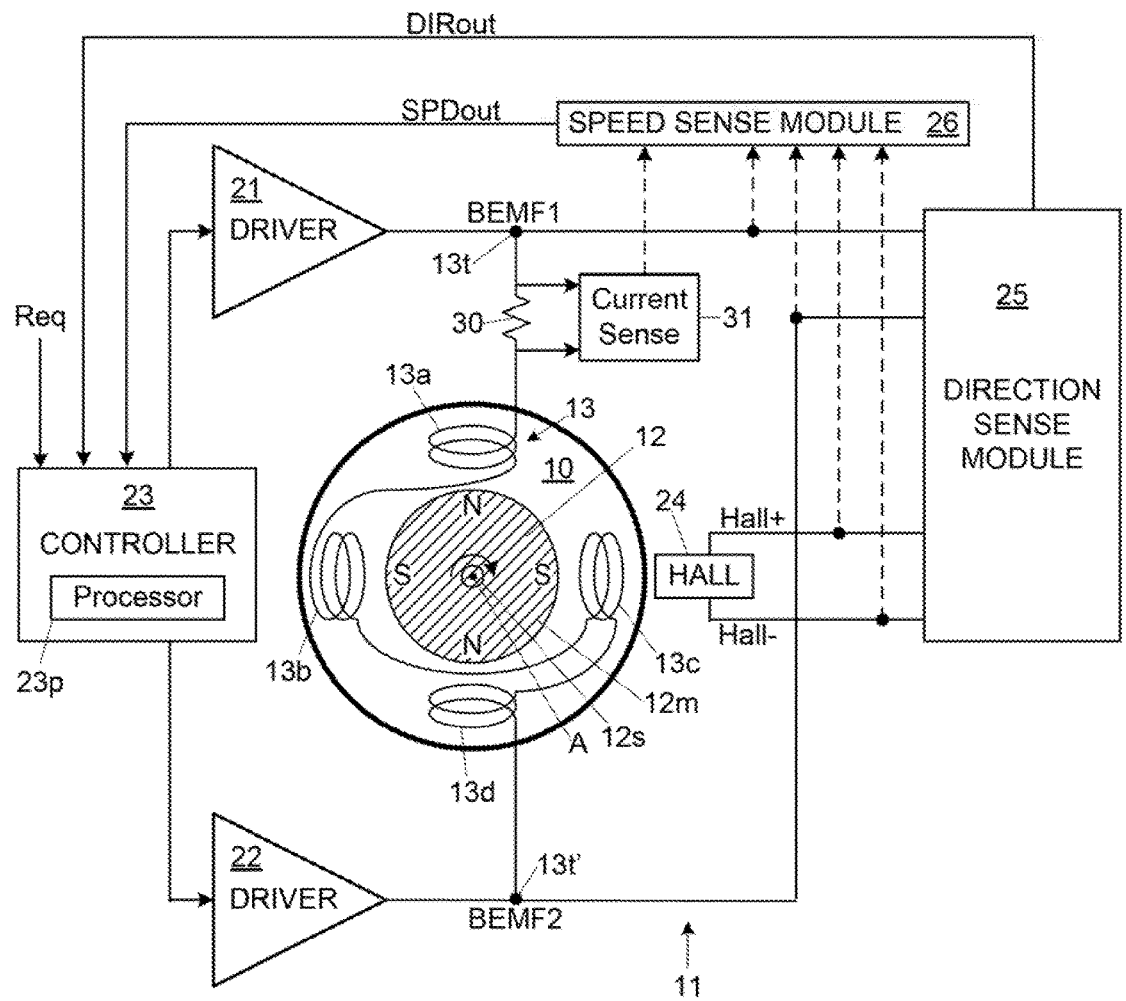
FIG. 1 is a schematic diagram of an example motor and drive circuit, according to an embodiment of the present disclosure, in which the drive circuit activates coils of the motor to drive a rotor of the motor.

FIG. 1 shows an example motor system that includes a motor 10 and a drive circuit 11, according to an embodiment of the present disclosure. The motor 10 is a brushless DC (BLDC) motor that includes a rotor 12 and a coil structure 13. The drive circuit 11 includes all components in FIG. 1 except for the motor 10, in an embodiment. The drive circuit 11 receives a request to drive the rotor 12 to rotate in a forward direction, for example to provide a predetermined sequence of electric current pulses to the coil structure 13 to cause the rotor 12 to be driven to rotate in the forward direction. Before initiating the sequence of pulses, the circuit 11 determines a residual spin direction of the rotor 12, in an embodiment. If the spin direction is a reverse direction (opposite the forward direction), the circuit 11 determines a time period for applying a brake to the motor to slow (e.g., stop) the rotor. The circuit 11 applies the brake for the determined time period. After lapse of the determined time period, the circuit 11 initiates the pulse sequence to the coil structure 13 to drive the rotor 12 in the forward direction. Accordingly, in an embodiment, the braking time is adapted to rotor speed.

In some instances in this disclosure, a term is followed by an alternative term or a substantially equivalent term enclosed in parentheses.

Rotation is "residual" if it is not due to the coils 13 being currently driven by the pulse sequence. For example, if the motor 10 is connected to a fan in a ventilation system, residual rotation can be due to the fan's blades being urged to rotate by airflow produced by neighboring fans in the ventilation system. Residual rotation can also be due to inertia from a previous, but now-ended, driving of the motor 10 by the drive circuit 11. Rotation due to inertia is residual, since it occurs when the rotor is not being driven by the drive circuit 11. Residual rotation can be in the forward or reverse direction.

The rotor 12, in an embodiment of FIG. 1, includes a magnet 12*m* that is mounted on a shaft 12*s*. The shaft 12*s* is supported by a bearing for rotation about a rotational axis A. The magnet 12*m* has four poles that are spaced uniformly circumferentially apart (by 90 degrees) about the axis A. The poles alternate between a north (N) pole and a south (S) pole about the axis A.

The coil structure 13, in the embodiment of FIG. 1, comprises four coils 13a, 13b, 13c, 13d that are spaced uniformly circumferentially apart (by 90 degrees) about the axis A. The coil structure 13 is single-phase, in that all of its coils 13a-13d are electrically connected together, in an embodiment. In this embodiment, the coils 13a-13d are electrically connected in series, from a first coil terminal 13t to an opposite second coil terminal 13t'. Rotation of the rotor magnet 12m induces a back EMF differential voltage (BEMF) at the terminals 13t, 13t'. The differential voltage (BEMF) corresponds to a first BEMF voltage (BEMF1) at the first terminal 13t minus a second BEMF voltage (BEMF2) at the second terminal 13t'.

Figure 2:
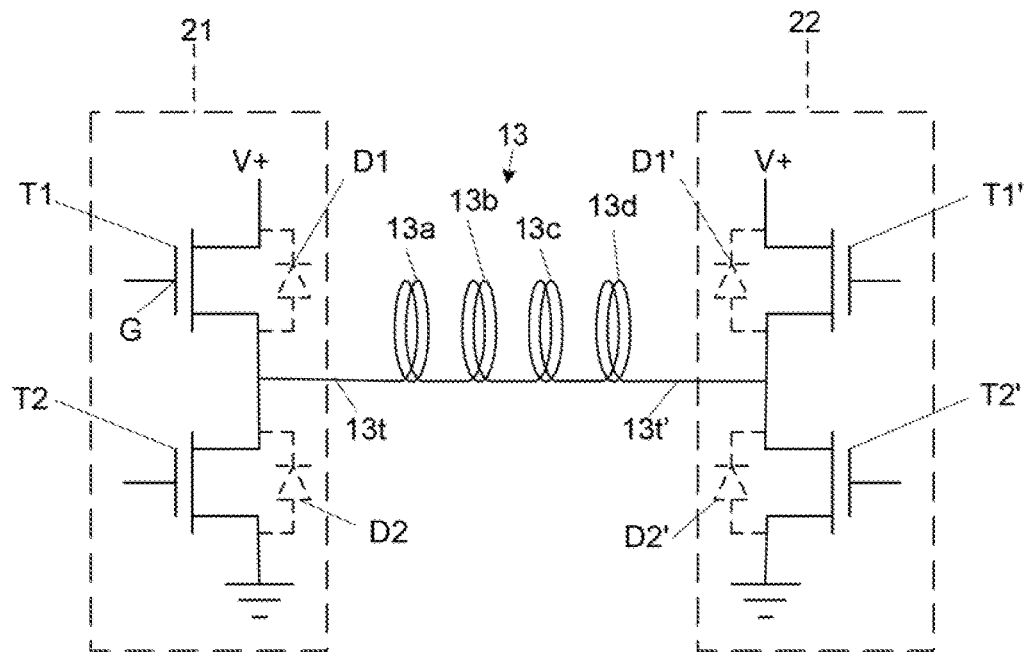
FIG. 2 is a schematic diagram of example coil drivers of the drive circuit of FIG. 1, according to an embodiment of the present disclosure.

Two coil drivers 21, 22 provide electrical power to the coil terminals 13t, 13t'. FIG. 2 is a schematic diagram of the drivers 21, 22, according to an embodiment of the present disclosure. The drivers 21, 22 and the coils 13a-13d together comprise an H-bridge. In FIG. 2, each driver 21, 22 includes two transistors, in this example FETs T1, T2, T1', T2', connected in series from a positive (high) voltage rail (V+) to a ground rail. Each FET can conduct forward current (from V+ toward ground) only when turned on via the respective transistor's gate G. Each FET T1, T2, T1', T2' in this example includes an internal body diode D1, D2, D1', D2'. Each body diode D1, D2, D1', D2' is portrayed in dashed lines to indicate that, in this example, the diode is part of, and not external to, the respective transistor. Due to the body diode, each transistor can conduct reverse current (from ground toward V+) even when the transistor is not turned on. The body diodes D1, D2, D1', D2' prevent the coil terminals 13t, 13t" from substantially exceeding the positive voltage rail V+ or dropping substantially below the ground rail.

The coil drivers 21, 22, in the example embodiment of FIG. 2, are configured to provide four conditions (modes) to the coil structure 13: forward current, reverse current, open circuit, and short circuit. To implement the forward current condition, the first driver's upper FET T1 and the second driver's lower FET T2' are turned on. To implement the reverse current condition, the first driver's lower FET T2 and the second driver's upper FET T1' are turned on. To implement the short circuit condition, both lower FETs T2, T2' are turned on. In an alternative implementation of the short circuit condition, both upper FETs T1, T1' are turned on. To implement the open circuit condition, no FETs are turned on.

A controller 23, in the embodiment of FIG. 1, controls the drivers 21, 22 by sending (applying) signals to gates G (FIG. 2) of the FETs T1, T2, T1', T2'. The controller 23 has a control input configured to receive a control signal (Req) corresponding to a request for the controller 23 to drive the rotor 12 in the forward direction. In response to receiving the control signal, the controller 23 controls the drivers 21, 22 to output the sequence of pulses to the coil structure 13 to drive the rotor 12 in the forward direction. The predetermined pulse sequence comprises pulses of forward current and pulses of reverse current, separated by (interspersed between) tri-state time-periods.

The controller 23, in the example embodiment of FIG. 1, includes a processor 23p that controls functions of the circuit 11. The functions include, for example, receiving indications of the rotor's direction and speed, controlling the coil drivers 21, 22 and performing calculations. The processor 23p performs functions of the controller 23 by executing software instructions of a program. The program is stored on a non-transitory data storage medium (e.g., ROM) of the processor 23p. In an alternative embodiment, instead of a processor, the controller 23 includes a network of discrete logic components that perform their functions without executing a software program.

The controller 23, in the embodiment of FIG. 1, uses an algorithm to determine parameters for controlling the pulses. Some parameters can define, for example, the start time and duration of each pulse for driving the rotor. Other parameters can, if the pulses driving the rotor are implemented with pulse width modulation (PWM), define each pulse's PWM duty cycle and PWM switching frequency. The algorithm uses control schemes that are different for different speed range (stages), in an embodiment. Each speed range has unique "S" designation. For example, S1 is designated for speeds below 500 rpm, S2 is designated for speeds between 500 rpm and 1000 rpm, and S3 is designated for speeds over 1000 rpm. As the rotor 12 accelerates from S1 to S2 to S3, the control scheme respectively changes from motor phase sensing mode to speed acceleration mode to a mode of reaching target speed. Different schemes base the pulse-control parameters on a different type of sensed data and/or a different algorithm for processing the data. For example, the S1 stage scheme determines pulse timing based on Hall sensor output, whereas the S2 stage scheme determines pulse timing based on inductive sensing.

A magnetic field sensor 24, in the example embodiment of FIG. 1, outputs a raw signal that is indicative of a magnetic field that is emitted by the rotor magnet 12m and sensed by the magnetic field sensor 24. The magnetic field sensor 24 in this embodiment is a Hall effect sensor (Hall sensor) that outputs a primary sensor signal (positive output Hall+) that is indicative of the magnetic field. The Hall+ signal comprises a voltage whose amplitude is related to magnetic field strength, and whose polarity (positive or negative) corresponds to magnetic field direction. Hall+ is, in an embodiment, proportional to the magnetic field strength. The Hall sensor's output is differential, in that it includes a complementary output (negative Hall−) that is equal in amplitude but opposite in polarity to the primary sensor signal (Hall+).

A direction sense module 25, in the embodiment of FIG. 1, determines (detects) the rotor's spin direction. In one embodiment, the direction determination is based on a comparison between the sensed magnetic field output (Hall+, Hall−) and the coils structure's back EMF (BEMF). The direction sense module 25 outputs a signal DIRout, in either analog or digital format, that is indicative of the determined spin direction. The controller 23 then determines spin direction by inputting DIRout.

In another embodiment, the direction determination is based on a comparison between outputs of multiple magnetic-field sensors (e.g., Hall sensors) that are spaced circumferentially apart about the rotor 12. The sensors provide outputs that follow a first sequence when the rotor 12 is rotating in the forward direction and follow a second sequence when the rotor 12 is rotating in the reverse direction. The direction sense module 25 determines spin direction by identifying which of the two sequences the magnetic-field sensors' outputs are following.

In another embodiment, the motor is multi-phase. The direction determination is based on a comparison of different BEMFs of different coil phases. Different BEMF outputs from the different coil phases follow a first sequence when the rotor 12 is residually rotating in the forward direction and follow a second sequence when the rotor 12 is residually rotating in the reverse direction. The direction sense module 25 determines spin direction by identifying which of the two sequences the coil phase outputs are following.

In another embodiment in which the motor 10 is multiphase, the controller 23 determines rotor position through inductive position sensing instead of a magnetic field sensor. Inductive position sensing entails measuring the inductance of each pair of phases. A three-phase motor, for example, would have six phase pairs. Since each angular position of the rotor 12 yields a unique combination of inductance measurements (one inductance measurement for each phase pair), the controller 23 determines rotor position by comparing the inductance measurements to each other. The inductance measurements are obtained as follows. A preset positive voltage is applied to each phase pair, and the resulting rise in the respective pair's current is recorded (monitored). When the current reaches a threshold value, the preset positive voltage is replaced with ground, and the resulting decline in current is recorded. In an example, recording of the current, while rising and then declining, results in traces shown in FIG. 3.

Figure 3:
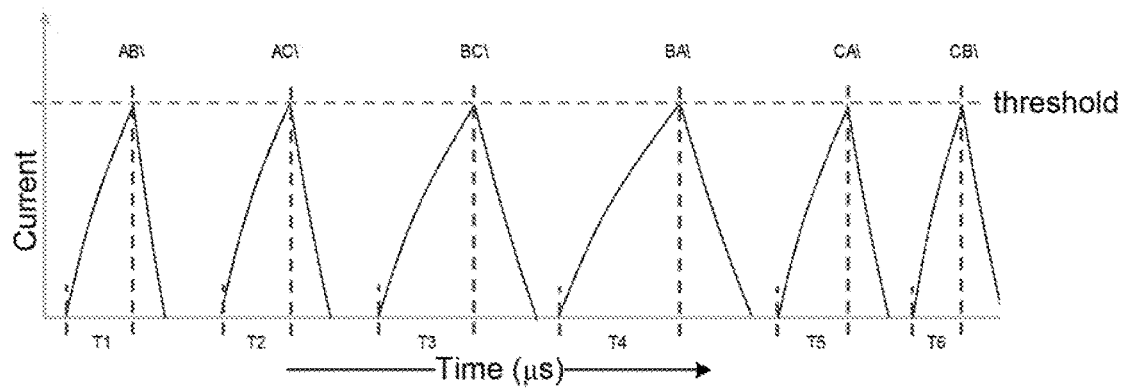
FIG. 3 shows example traces of current flowing through the coils of FIG. 1 versus time, used to determine the position of the rotor of FIG. 1, according to an embodiment of the present disclosure.

FIG. 3 shows an example series of current-vs-time traces, according to an embodiment of the present disclosure, that are output by six phase pairs for a three-phase motor. Each of the six traces represents an output of a respective phase pair. Each of the six traces rises from zero to the threshold and then declines back to zero. The duration (time period) of each rise and decline is a positive function of the respective phase pairs' inductance (where "positive function" indicates duration increases with increasing inductance). The duration can therefore serve as the inductance measurement for determining rotor position. The curves in FIG. 7 relate to a motor that has three phases, denoted A, B and C, and thus has six pairs denoted AB\, AC\, BC\, BA\, CA\ and CB\, with time durations respectively designated T1-T6. The applied voltage (to raise the current) is sufficiently small to avoid affecting rotor position or speed. The controller 23 can, in an embodiment, use inductively-sensed position determinations of the rotor 12 to determine spin direction.

A speed sense module 26, in the embodiment of FIG. 1, determines the rotor's spin speed. The speed determination is based on a magnetic field sensor output or a BEMF output. Input lines from these outputs (Hall+, Hall−, BEMF1, BEMF2) are portrayed in FIG. 1 with dashed lines to indicate that any one or more of these outputs could be input by the speed sense module 26. In different embodiments, the speed sense module 26 determines spin speed as a function of (based on) amplitude of the differential Hall output or BEMF, or as a function of frequency of the differential Hall output or BEMF. The speed sense module 26 outputs a signal SPDout, in either analog or digital format, that is indicative of the determined spin speed. The controller 23 then determines spin speed by inputting SPDout.

One example method of operation of the motor system of FIG. 1 is as follows. The controller 23 receives a control signal (Req) corresponding to a request to output a sequence of pulses to the coil structure 13 to drive the rotor 12 in the forward direction. After receiving the request, but before applying the sequence of pulses, the controller 23 receives the direction signal DIRout and the speed signal SPDout to determine the rotor's residual direction and speed.

If the direction signal DIRout indicates a forward spin direction, then the controller 23 initiates the sequence of pulses, to the coil structure 13 to drive the rotor 12 in the forward direction, substantially immediately (e.g., immediately). However, if the direction signal DIRout indicates a reverse spin direction and the speed signal SPDout indicates a speed that exceeds a predetermined threshold, then the controller 23 applies a brake before applying the pulse sequence. The threshold can be zero or non-zero.

When the residual rotation is reverse, slowing (and especially slowing to stop) the rotor 12 before initiating the forward-direction drive pulses reduces startup current (current initially drawn by the drive pulses), in an embodiment. Startup current drawn through the coils 13 and FETs T1, T2, T1', T2' (FIG. 2) to drive the rotor 12 in the forward direction is reduced if initiated when the rotor 12 is stopped, relative to if the driving were initiated when the rotor 12 is rotating in reverse. If the residual spin is reverse, startup current drawn through the coils and FETs to drive the rotor in the forward direction is reduced if initiated when the rotor is first slowed (even if not slowed to a stop) relative to if initiated without first slowing the rotor 12. The reduction in startup current due to braking before driving the rotor reduces the chance of overheating the FETs and coils, compared to not braking before driving. The reduction in startup current due to braking before driving the rotor also enables use of FETs of lower load-rating and coil windings of smaller gauge, compared what the load-rating and coil windings would need to be if not braking before driving.

In the embodiment of FIG. 1, the drive circuit 11 (or just the controller 23) determines speed after, and in response to, determining that the direction is reverse. In another embodiment, the drive circuit 11 determines direction after, and in response to, determining that the speed exceeds the first speed threshold. In yet another embodiment, the drive circuit 11 determines both direction and speed, in any order, without the determination of one being in response to the result of the other.

In the embodiment of FIG. 1, the direction and speed sense modules 25, 26 are hardware components that continuously output indications of direction and speed at all times. Therefore, even before the controller 23 receives the request to drive the rotor 12, the direction and speed indications (DIRout and SPDout) are immediately available to the controller 23. So the controller 23 does not have to issue a request for the direction and speed indications. In another embodiment, the direction and speed sense modules 25, 26 determine and output direction and speed in response to a request from the controller 23. In yet another embodiment, the direction and speed modules 25, 26 are hardware peripherals of the controller 23 itself. In yet another embodiment, the direction and speed modules 25, 26 are software modules within a program of software instructions that is executed by the controller's processor 23p. The program is stored on a non-transitory data storage medium (e.g., ROM) of the controller 23, in an embodiment.

In one embodiment of FIG. 1, the controller 23 applies the brake electrically, by controlling the drivers 21, 22 to short-circuit the coil terminals 13t, 13t', which drains the energy from the coils 13. In another embodiment, the controller 23 applies a brake frictionally, by controlling a braking device (not shown) to apply friction against the rotor 12 or against a component (not shown) fixed to the rotor 12.

In an embodiment of the present disclosure, the circuit 11 includes a resistor 30 connected in series with the coil structure 13. When the coil structure 13 is shorted by the drivers 21, 22, induced current (flowing through the coils) is conducted through the resistor 30. In an embodiment, the resistor 30 has a resistance that is too small to have a substantial effect on deceleration or energy drain. During braking and the resulting deceleration, a current sense module 31 measures voltage drop across the resistor 30 to determine spin speed as a positive function of the voltage drop (where "positive function" indicates spin speed increases with increasing voltage and decreases with decreasing voltage). In one embodiment, the current sense module 31 is a hardware module that outputs a signal indicative of the determined coil current to the speed sense module 26. And the speed sense module 26 uses the determined coil current to determine spin speed. In another embodiment, the current sense module 31 is a component of the speed sense module 26.

The controller 23, in the embodiment of FIG. 1, determines a braking time period (braking duration) corresponding to how long the braking should be applied to slow the rotor 12 before starting to drive the rotor 12 in the forward direction. In an embodiment, slowing the rotor includes stopping the rotor, so the controller 23 determines a braking time period corresponding to how long the braking should be applied to stop the rotor 12.

The controller 23 calculates the braking duration as a function of the sensed reverse-direction speed. The function, in one embodiment, is a linear function, defined by Y=AX+C, where Y is the time duration, X is the sensed speed, A is a scaling factor (coefficient, slope), and C is an intercept (constant). If the intercept C is zero, the duration is proportional to speed. The determination is performed, for example, by performing the calculation Y=AX+C or, in another example, by performing a lookup in a software lookup table. The controller 23 determines the braking duration while the brake is being applied, or before the brake is applied.

In other embodiments, the function is non-linear. An example of a non-linear function is an exponential function for example Y=D^X (i.e., D to the Xth power) in which D is a predetermined constant, Y is the time duration, and X is the sensed speed. Another example of a non-linear function is a polynomial function in which Y is equal to a sum of terms. Each term in the sum has the form GX^I (i.e., G times X to the Ith power), in which I can be any number (positive or negative or zero) and G is a predetermined constant associated with the respective term.

In an embodiment of the present disclosure, the controller 23, along with the entire drive circuit 11, is designed by its manufacturer to be usable for a variety of motors. Therefore, the controller 23 is designed to enable the scaling factor and intercept to be programmable by a user (customer) who is connecting the controller 23 to the motor 10. The user programs the scaling factor and intercept into the controller 23 through a dedicated scaling factor input of the controller 23, or through a general purpose communication line (e.g., USB cable) from an external circuit (e.g., computer or keyboard) to the controller 23. The scaling factor is larger for a rotor 12 of higher moment of inertia (which would need a longer braking duration) and lower for use with a rotor 12 of lower moment of inertia (which would need a shorter braking duration). The manufacturer of the drive circuit 11 can provide the user with a correlation that specifies the scaling factor and the intercept as a function of the rotor's moment of inertia. The correlation can be provided by the manufacturer in the form of a formula or graph or lookup table. Accordingly, the brake is applied for a duration that is adapted to the rotor, in that the duration is determined as a function of both the rotor's residual speed (X in the above equation) and the rotor's moment of inertia (via A in the above equation).

The controller 23 applies the brake for the determined time period. At the end of the time period, the rotor 12 is stopped, or sufficiently slow, to enable the controller 23 to immediately (substantially immediately) initiate driving the rotor 12 in the forward direction.

In an embodiment, the controller 23, upon lapse of the time period, determines the reverse-direction speed again. In an embodiment, the determination of the reverse-direction speed is based on output of the current sense module 30. If the reverse-direction speed exceeds the threshold, then the controller 23 determines a second time period based on the newly measured speed, and re-applies the brake for the second time period. Upon lapse of the second time period, the controller 23 immediately (substantially immediately) starts driving the rotor 12 in the forward direction. In an alternative embodiment, the controller 23 monitors the reverse-direction speed during application of the brake. If the reverse-direction speed reaches zero before lapse of the determined braking time period, the controller 23 initiates driving the rotor 12 in the forward direction without waiting for the determined braking time period to lapse.

Figure 4:
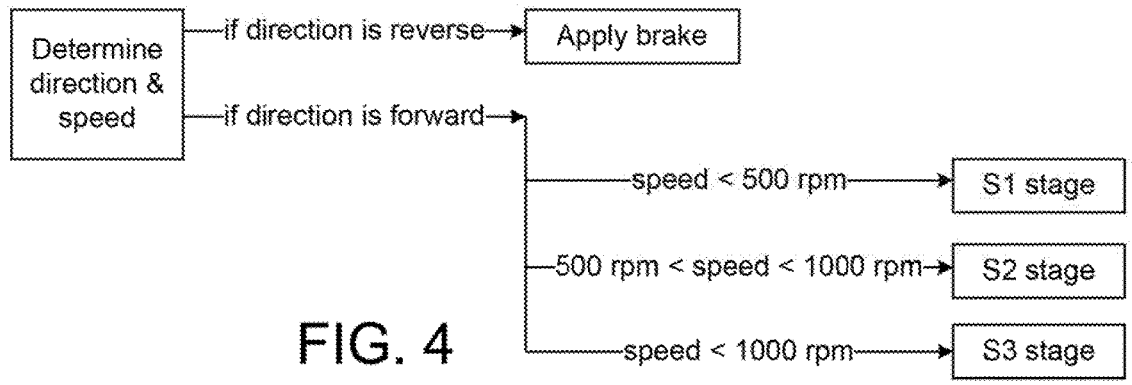
FIG. 4 shows an example sequence of logic implemented by the drive circuit of FIG. 1 to control the motor, according to an embodiment of the present disclosure.

In an embodiment, if, after the controller 23 receives the request to drive the rotor 12 forward, the controller 23 determines (from DIRout) that the spin direction is forward, then the controller 23 determines the stage (speed range) corresponding to the residual speed. The controller 23 then initiates driving the rotor 12 using the control scheme of the determined stage. If the speed range is, for example, S2, then the controller initiates driving the rotor using the S2 control scheme (instead of the S1 control scheme that would normally be used when accelerating the rotor 12 from zero speed). The controller's determination, of whether to apply the brake and which drive scheme to use, is illustrated by a logic diagram in FIG. 4. In FIG. 4, direction and speed are determined. If the direction is reverse, then the brake is applied. If the direction is instead forward, then the rotor is initially driven in the forward direction. The rotor is initially driven based on the S1 scheme if the speed is in the S1 range, and based on the S2 scheme if the speed is in the S2 range, and based on the S3 scheme if the speed is in the S3 range.

In the embodiment of FIG. 1, the technique (system and method) for using sensed direction and speed for applying a brake is an example for a single-phase motor. In an alternative embodiment, the technique is applied to a multi-phase motor (e.g., 2-phase, 3-phase, etc). The brake is applied electrically, by shorting all of the motor's coil phases or by shorting only a subset of one or more of the coil phases. Alternatively, the brake can be applied frictionally.

Figure 5:
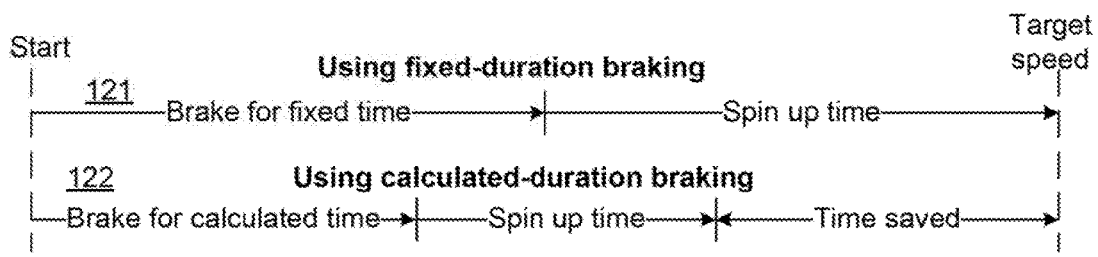
FIG. 5 is an example timing diagram, according to an embodiment of the present disclosure, illustrating the time required for the rotor of FIG. 1 to reach a target spin speed using a calculated-duration technique of braking implemented by the drive circuit of FIG. 1, compared to a fixed-duration technique of braking.

The controller 23 uses a technique of applying a brake for a duration that is determined (in this example calculated) as a function of the residual speed. This calculated-duration technique, compared to a technique of applying a brake for a fixed duration independent of residual speed, in an embodiment, reduces the amount of time needed to bring the rotor up to target speed. FIG. 5 shows two timing diagrams for a given motor, comparing the calculated-duration technique (time diagram 121) to the fixed-duration technique (timing diagram 122). Since the fixed duration is independent of speed, it is designed to be long enough to be suitable for any residual speed the rotor is likely to have. FIG. 5 shows that the calculated braking duration (in 122) can be less than the fixed braking duration (in 121), since the calculated braking duration does not need to be suitable for any speed the rotor is likely to have. Since both techniques have substantially the same spin up time (time to accelerate to target speed), the calculated-duration technique shortens the time to reach the target speed compared to the fixed-duration technique.

Figure 6:
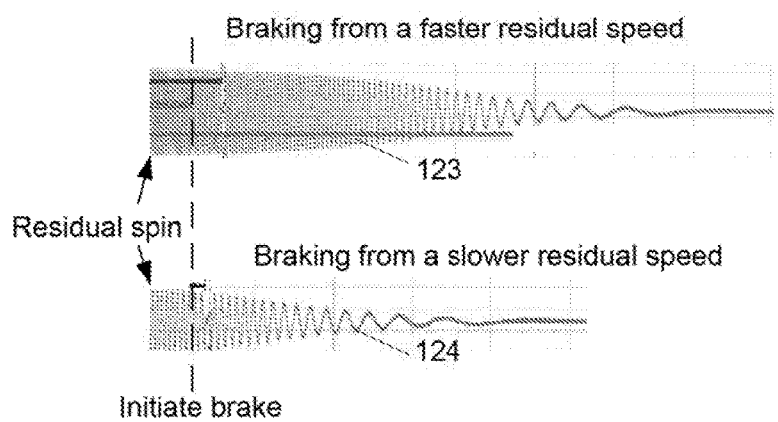
FIG. 6 shows examples of two different traces of current, drawn through the coils of FIG. 1, versus time, during braking from two different residual spin speeds, according to an embodiment of the present disclosure.
Figure 7:
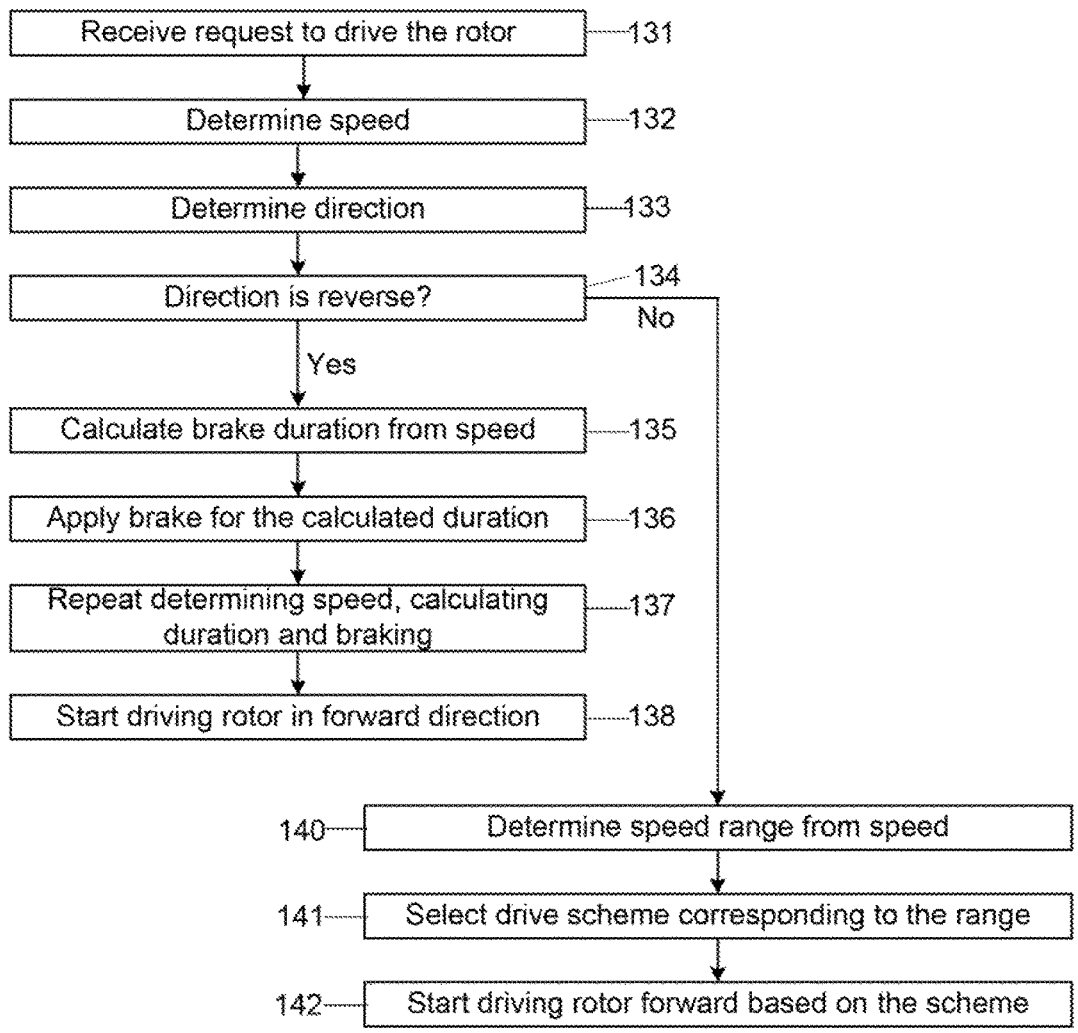
FIG. 7 is a flow diagram of an example method of using the drive circuit of FIG. 1 to control the motor of FIG. 1, according to an embodiment of the present disclosure.

FIG. 6 shows two traces 123, 124 of coil current for a given motor, as the motor's rotor starts off with a residual reverse spin and then decelerates due to application of a brake. The rotor has stopped where the traces' current has leveled off. The residual speed is 8060 rpm in the upper trace 123 and 3550 rpm in the lower trace 124. Due to this difference in residual speed, the rotor comes to a stop in 850 ms in the upper trace and in only 500 ms in the lower trace, for example. FIG. 6 thus illustrates the dependency of braking time on residual speed, which is the basis of equation Y=AX+C presented above FIG. 7 is a flow chart of an example method (procedure) performed by the drive circuit 11, according to an embodiment of the present disclosure: In 131, the controller 23 receives a signal indicative of a request to drive the rotor. Before starting to drive the rotor, the controller determines the rotor's residual spin speed in 132 and residual spin direction in 133. In a first example, the determinations of speed and direction are independent of each other. In a second example, the speed determination is in response to the direction being reverse. In a third example, the direction determination is in response to the speed exceeding a threshold. In 134, the controller determines whether sensed direction is reverse. If the sensed direction is reverse, then the following occurs. In 135, the controller 23 determines (in this example calculates) a brake duration. In 136, the controller applies a brake for the determined duration. In 137, the controller repeats the determination of speed, the calculation of duration and the braking for the newly calculated duration. In 138, the controller starts driving the rotor in the forward direction. If, however, the controller in 134 determines that the direction is forward, then the following occurs: In 140, the controller determines a speed range (stage) of the rotor. In 141, the controller selects drive scheme corresponding to the determined speed range. In 142, the controller starts driving the rotor in the forward direction based on the corresponding drive scheme.

This application uses examples to illustrate the invention. The patentable scope of the invention may include other examples.

The invention claimed is:

1. A method performed by a drive circuit for a brushless motor that includes a rotor and a coil structure comprising at least one coil, the method comprising:
    receiving a request to drive the rotor in a forward direction;
    sensing a residual direction of the rotor;
    sensing a residual speed of the rotor;
    at least partially in response to the sensed residual direction being a reverse direction opposite the forward direction,
        determining a time period as a function of the sensed residual speed, for applying a brake to the motor to slow the rotor,
        applying the brake for the determined time period, and
        after lapse of the determined time period, initiate driving the rotor to rotate in the forward direction.

2. The method of claim 1, comprising, applying the brake electrically, by draining energy from the coil structure.

3. The method of claim 1, comprising, applying the brake frictionally, by controlling a braking device to apply friction against the rotor or against a component fixed to the rotor.

4. The method of claim 1, comprising, determining the time period as a function of the sensed residual speed, for applying a brake to the motor to stop the rotor.

5. The method of claim 1, comprising, determining the time period as a function of the sensed residual speed, at least partially in response to both the sensed residual direction being the reverse direction and the sensed residual speed exceeding a predetermined non-zero threshold.

6. The method of claim 1, comprising, determining the time period as a linear function of the sensed residual speed.

7. The method of claim 1, comprising, determining the time period as proportional to the sensed residual speed.

8. The method of claim 1, comprising, sensing the residual direction of the rotor at least partially based on identifying a sequence of outputs from magnetic-field sensors that sense a magnetic field generated by the rotor.

9. The method of claim 1, comprising, sensing the residual direction of the rotor at least partially based on inductive position sensing.

10. The method of claim 1, comprising, sensing the residual speed of the rotor at least partially based on an output of a magnetic field sensor.

11. The method of claim 7, comprising, sensing the residual speed of the rotor at least partially based on an output of a Hall effect magnetic field sensor.

12. The method of claim 1, comprising, sensing the residual speed of the rotor at least partially based on a back electromotive force (EMF) of the coil structure.

13. The method of claim 1, comprising, after the lapse of the determined time period, initiating driving the rotor to rotate in the forward direction by applying a predetermined sequence of pulses to the coil structure.

14. The method of claim 1, further comprising, after the lapse of the determined time period but before driving the rotor in the forward direction,
    sensing a second residual speed of the rotor;
    at last partially in response to the sensed second residual speed exceeding a threshold speed,
        determining, as a function of the sensed second residual speed, a second time period for applying the brake, and
        applying the brake for the determined second time period, wherein the initiating of driving the rotor is performed upon lapse of the second time period.

15. The method of claim 1, further comprising:
    determining the speed of the rotor during application of the brake by measuring induced current flowing through the coil structure.

16. A drive circuit for a brushless motor that includes a rotor and a coil structure comprising at least one coil, the drive circuit comprising:
    an input configured to receive a request to drive the rotor in a forward direction;
    a direction sense module configured to sense a residual direction of the rotor;
    a speed sense module configured to sense a residual speed of the rotor; and
    a processor configured to, at least partially in response to the residual direction being a reverse direction opposite the forward direction,
        determine a time period, as a function of the speed, for applying a brake to the motor to slow the rotor,
        apply the brake for the determined time period, and
        after lapse of the determined time period, initiate driving the rotor in the forward direction.

17. The drive circuit of claim 16, wherein the processor is configured to:
    in response to the sensed residual speed being zero, apply a predetermined pulse sequence to the coil structure to accelerate the rotor using a first control scheme while the rotor speed is within a lower speed range and using a second control scheme while the rotor speed is within a higher speed range; and
    in response to the sensed residual direction being forward direction and the sensed residual speed being within the higher speed range, start applying the predetermined pulse sequence of using the second control scheme instead of the first control scheme.

18. The drive circuit of claim 16, wherein the processor is configured to determine the time period as a linear function of the sensed speed, and wherein the drive circuit is configured to enable a slope of the linear function to be programmable.

19. The drive circuit of claim 16, further comprising:
at least one driver configured to be activated by the controller to apply the brake by draining energy from the coil structure.

20. A non-transitory data storage medium containing software instructions configured to be executed by a drive circuit to control a brushless motor that includes a rotor and a coil structure comprising at least one coil, by:
receiving a request to drive the rotor in a forward direction;
sensing a residual direction of the rotor;
sensing a residual speed of the rotor;
at least partially in response to the sensed residual direction being a reverse direction opposite the forward direction,
determining a time period as a function of the sensed residual speed, for applying a brake to the motor to slow the rotor,
applying the brake for the determined time period, and
after lapse of the determined time period, initiate driving the rotor to rotate in the forward direction.

* * * * *